United States Patent [19]

Doumit et al.

[11] 4,203,130
[45] May 13, 1980

[54] INFORMATION DISPLAYING SYSTEM

[75] Inventors: Joseph A. Doumit, New Iberia, La.; Robert E. Weiblen, Towson, Md.

[73] Assignee: Dial-A-Channel, Inc., New Iberia, La.

[21] Appl. No.: 758,553

[22] Filed: Jan. 11, 1977

[51] Int. Cl.$^2$ ............................................. H04N 9/02
[52] U.S. Cl. .......................................... 358/1; 358/83; 358/130; 358/183
[58] Field of Search ...................... 358/1, 6, 12, 83, 93, 358/183, 130, 214, 142, 254

[56] References Cited
U.S. PATENT DOCUMENTS 2,751,583  6/1956  Jones ................................... 358/254

Primary Examiner—Richard Murray
Attorney, Agent, or Firm—Clarence A. O'Brien; Harvey B. Jacobson

[57] ABSTRACT

Program schedules together with other periodically updated information is displayed to subscribers through a cable television system. The information is derived from optical image recordings and electronically generated from digital circuitry for display in synchronized relation to audio and color signals. The optically derived and digitally generated video signals together with color control signals are combined in a video mixer to modulate the output of a cable television transmitter operating on any desired channel.

19 Claims, 9 Drawing Figures

INFORMATION DISPLAYING SYSTEM

BACKGROUND OF THE INVENTION

This invention relates to the display of program schedule information and other data to cable television subscribers on a selected channel and is an improvement over the invention disclosed in U.S. Pat. No. 3,956,579 and in prior copending application U.S. Ser. No. 683,954, filed May 6, 1976, owned in common with the present application.

In the aforementioned prior copending application, the disclosure of which is incorporated herein, program schedule information as well as commercial advertising matter is recorded as images on film from which video signals are derived through a pair of video record players. The video record players are of a commercially available flying-spot scanner type having two film frame channels and a film transport mechanism modified to effect bi-directional movement of the film under automatic control. Movement of the film in opposite directions, one frame at a time, is effected in one of the video record players to alternately display different program scheduling information while unidirectional movement of the film in the other of the video record players is reversed after the information recorded on one channel frame is exhausted, so that additional information on the other frame channel may be displayed. Conventional audio tape players are operated in synchronized relation to each of the video record players in order to produce accompanying audio signals fed to the transmitter. Incremental movement of the film in each of the video record players is effected by a reversing drive arrangement operating through a self-locking gear to advance the film one frame at a time in opposite directions. The reversing drive arrangement is operated in synchronized relationship to a frame channel changer. Precise stopping of the film is controlled by synchronized signals recorded on the film itself between the frames. Operation of the audio tape players is coordinated with the video record players through track changer and stop/start controls and synchronized by means of signal tones recorded on one of the tracks of the audio tape. A motor driven sequence control associated with the system selects the different program schedule and commercial information in a cyclically repeating sequence with periodic updating of the information.

The sequence controller disclosed in the aforementioned copending application is of the electromechanical type. Further, the color generating facilities available with the video record player units were not utilized. It is, therefore, an important object of the present invention to provide a system for displaying program schedule information which avoids as much as possible the use of electromechanical controls and expands the amount of information stored as well as to enlarge the type of information displayed so as to include time and temperature data and color.

SUMMARY OF THE INVENTION

In accordance with the present invention, solid state digital logic circuitry is utilized to produce sequence control commands for selecting and timing the continuous flow of information signals derived from an optical image record source, from electronic data generating circuitry and from an audio record source. The generation and supply of color signals is also effected under control of the sequence commands. Selected video signals derived from the optical image record are mixed with digital video signals and color signals in a video mixer in order to supply a composite video signal to the modulator section of a cable television transmitter producing the desired display on a subscriber's television receiver screen when the receiver is tuned to the selected informational channel. The receiver will accordingly display sequentially changing information derived from the aforementioned sources arranged in a predetermined format. The information displayed includes time and temperature in addition to program schedule information, said information being periodically updated. During the intervals that the program schedule information is being changed or updated, advertising commercials are displayed on the receiver screen. The color signals enhance the appearance and interest of the displays.

In one form of the invention, both the program schedule information and commercial matter are stored on optical film associated with a pair of video record players operated in synchronized relationship to the color signals to supply information under control of command signals from the solid state sequence controller. The sequence controller also controls digital generation of characters for time, temperature and information identification labels or headings displayed on the television receiver screen with the time and temperature information derived from a clock and a digital thermometer.

In another form of the invention, the program schedule information is stored in binary form in a tape cassette recorder and player unit from which the program schedule information is derived through a read/write memory and fed to the character generator from which the digital video signals are obtained.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
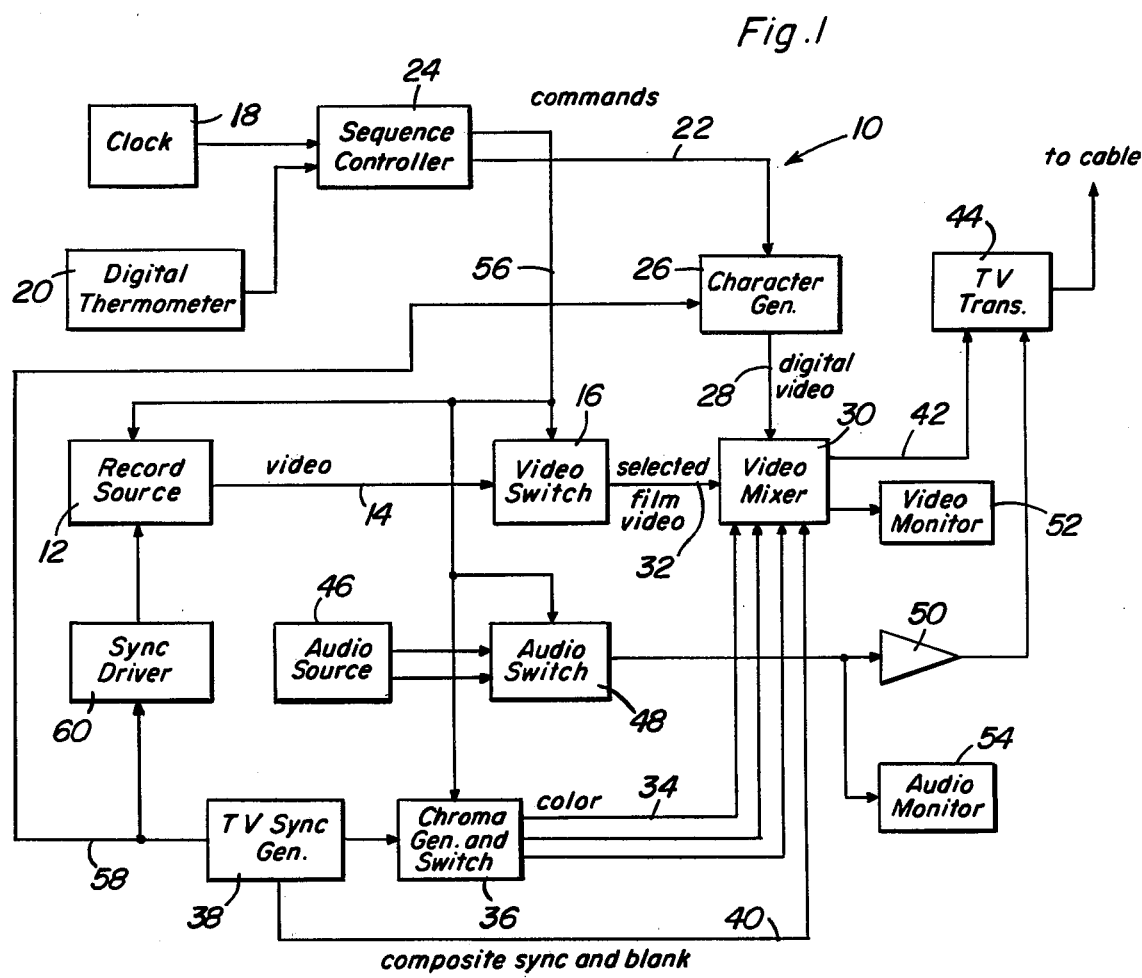
FIG. 1 is a block diagram schematically illustrating the system of the present invention.

Referring now to the drawings in detail, FIG. 1 schematically illustrates the system of the present invention generally referred to by reference numeral 10. Certain information to be displayed is derived from an image record source generally referred to by reference numeral 12 supplying video signals through line 14 to a video switch component 16. Time information is derived from a clock component 18 while outside temperature information is sensed by a digital thermometer component 20. The time and temperature information derived from the clock and digital thermometer is fed through line 22 from a sequence controller 24 to a character generator 26. The character generator develops information headings and converts the time and temperature information into human-readable form supplied by line 28 as digital video signals to a video mixer 30 to which selected video signals from the image record source is supplied through line 32. The video mixer also receives color signals through lines 34 from a chroma generator and switch component 36 driven by a television synch generator 38 which also supplies a composite synch and blank signal to the video mixer through line 40. Thus, a composite video signal output from the video mixer 30 is fed through line 42 to the modulator section of a cable television transmitter 44 adapted to produce the carrier for the composite video signal in order to form a desired display on the television receiver screen of a subscriber. The composite video signal display is accompanied by audio signals derived from an audio record source 46. Audio signal outputs from the audio record source are selected through an audio switch 48 and fed through audio amplifier 50 to the transmitter 44. The composite video signal and audio signal are respectively monitored through monitors 52 and 54. The selection of the video, audio and color signals is effected under control of the sequence controller 24 through sequence control commands in lines 56. Control over the character generator 26 in order to produce stable, synchronized letters and numbers is effected through line 58 connected to the TV synch generator 38 which also controls operation of the synch driver 60 for the image record source.

Figure 2:
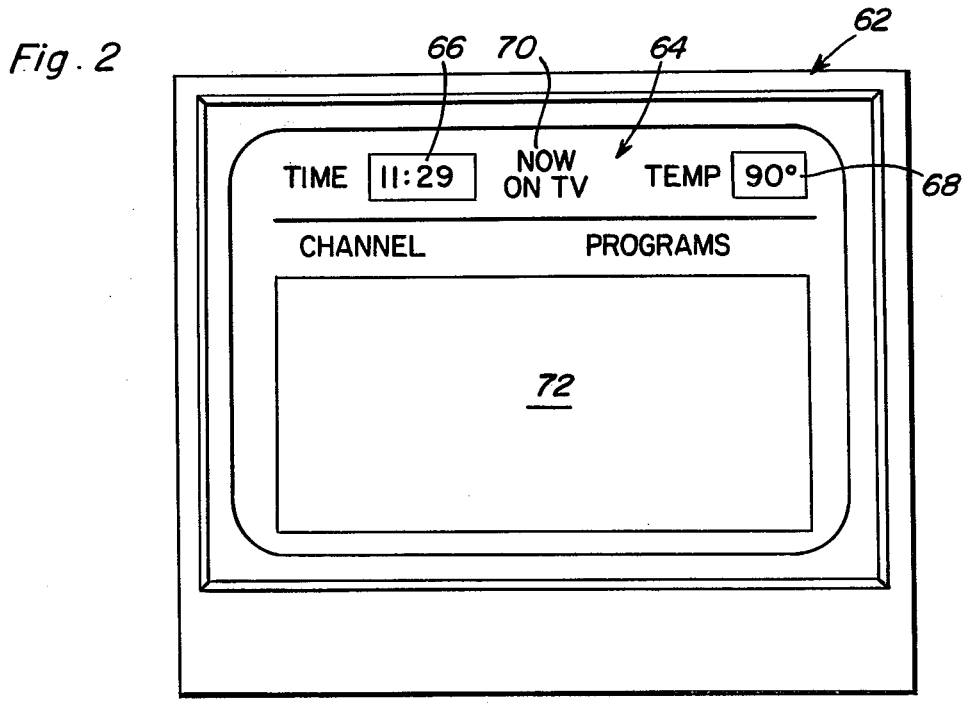
FIG. 2 is a front elevational view of a typical television screen display in accordance with the present invention.

FIG. 2 shows the television receiver screen 62 on which the desired display is obtained by the system of the present invention. The display includes a header portion generally referred to by reference numeral 64 which includes characters forming the words "TIME" and "TEMPERATURE." Updated time and temperature data is accordingly displayed adjacent the time and temperature headings at 66 and 68, respectively. A changeable heading in the header portion 64 is also displayed between the time and temperature headings at location 70. As shown in FIG. 2, the heading reads "NOW ON TV." This heading appears in the header portion for a time interval of 23 seconds each 60 second cycle after which the heading changes to the words "TONIGHT ON TV." The "TONIGHT ON TV" heading remains on for an interval of 22 seconds and is then removed for a 15 second interval leaving a blank space at location 70. During the 23 second and 22 second intervals associated with the headings "NOW" and "TONIGHT," different program schedule information appears on the major portion 72 of the screen corresponding to programs in progress and to a summary of the programs that follow during a 24-hour period. A 60 second cycle of display time is then completed by the 15 second interval during which the program schedule information is changed and the heading at location 70 is blank. Commercial matter is displayed on area 72 of the screen during this 15 second interval. Another 60 second cycle begins with the display of the word "NEXT" at location 70 accompanied by the program schedule information in area 72 corresponding to television programs to be broadcast during the immediately following program period. Each program period is one-half hour. The three types of program schedule information under the headings "NOW," "NEXT" and "TONIGHT" is repeated each two minutes, periodically updated, however, at the end of each half-hour program period. Thus, a six-step sequence is completed each two minutes as summarized in the following chart.

CHART

| SEQ-UENCE | VIDEO PLAYERS | | | | AUDIO PLAYERS | | DISPLAY | | | | | TIME (Sec.) DURA-TION |
|---|---|---|---|---|---|---|---|---|---|---|---|---|
| | PROGRAM CHANNELS | | COMMERCIAL CHANNELS | | PROG. | COMM. | | | HEADER | | | |
| | 88 | 90 | 92 | 94 | 98 | 100 | PROG. | COMM. | NOW | NEXT | TONIGHT | |
| 1 | X | | | | X | | X | | X | | | 23 |
| 2 | | X | | | X | | X | | | | X | 22 |
| 3 | | | X | | | X | | X | | | | 15 |
| 4 | X | | | | | | X | | | X | | 23 |
| 5 | | X | | | | | X | | | | X | 22 |
| 6 | | | X | | | | | X | | | | 15 |

Figure 3:
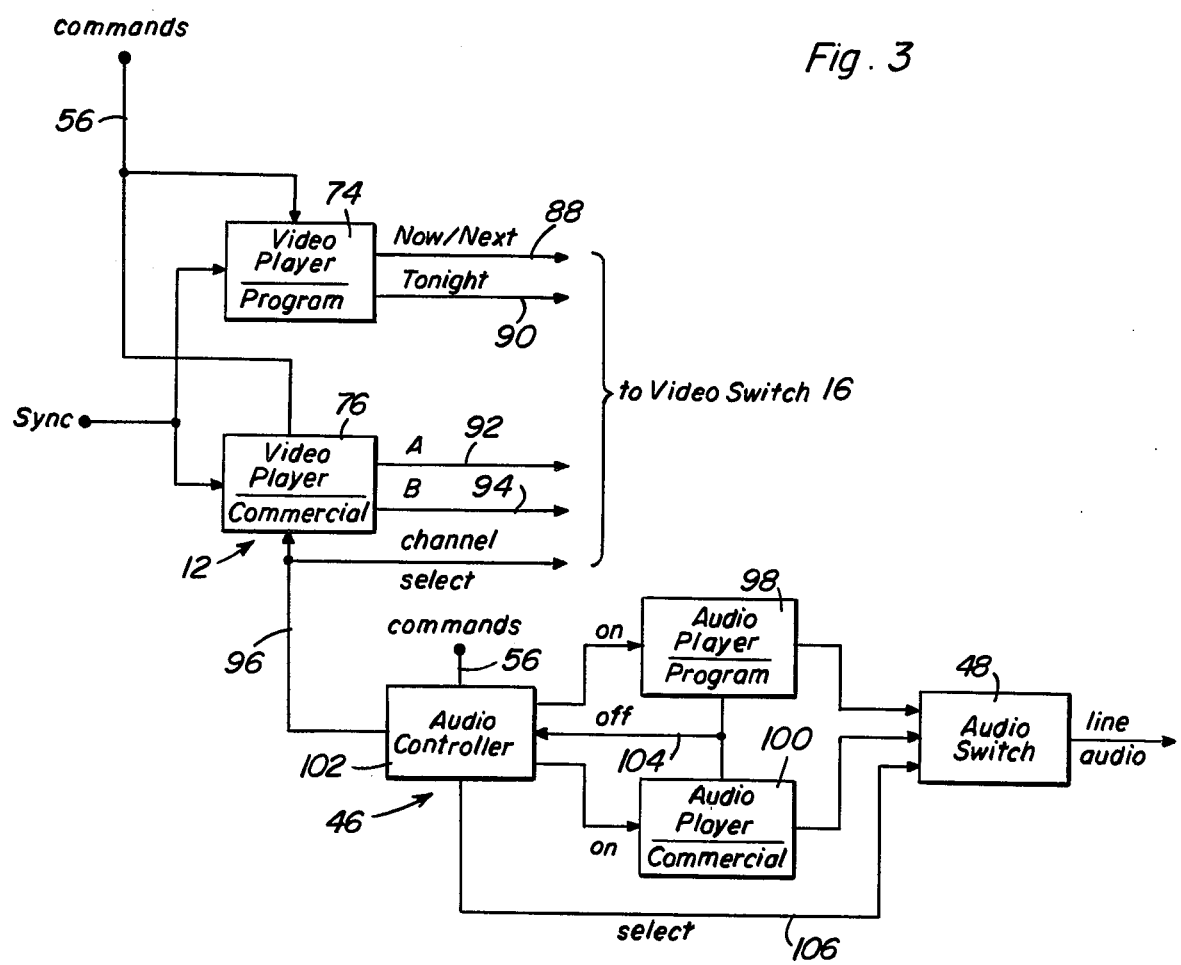
FIG. 3 is a block diagram showing in more detail a portion of the system depicted in FIG. 1, in accordance with one embodiment of the invention.
Figure 4:
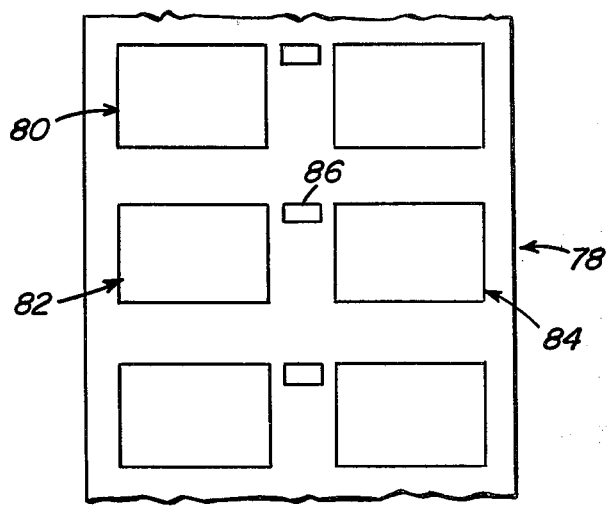
FIG. 4 is a front elevational view of a portion of the optical film utilized in the video player depicted in FIG. 3.

The foregoing chart indicates by X the header display in the form of "NOW," "NEXT" and "TONIGHT." Also, the chart indicates the signals selected from each of the components associated with the image record source 12 and the audio record source 46 for one particular embodiment of the invention depicted in FIG. 3. FIG. 3 schematically shows the use of two video player units 74 and 76 maintained in synchronism by the synch signal simultaneously supplied thereto from the synch driver 60 as aforementioned in connection with FIG. 1. Both video player units 74 and 76 store image information on film such as a film 78 shown in FIG. 4 for the program schedules having two series of frames corresponding to two separate video output channels. One of the frame channels includes alternate frames 80 and 82 as shown in FIG. 4 containing program schedule information respectively corresponding to the "NOW" and "NEXT" headings. The frames 84 of the other channel correspond to the heading "TONIGHT." Thus, the aforementioned chart shows video signals being displayed from the two channels 88 and 90 of the video player 74 containing current and upcoming programs and program summaries and from one of the channels 92 of video player unit 76 wherein the film frames contain advertising matter. The film also is provided with cue signal recordings 86 located between the channel frames in order to limit advancement of the film to one frame at a time, as described in the prior copending application aforementioned.

With continued reference to FIG. 3, it will be apparent that the embodiment illustrated is similar to the embodiment disclosed in the prior copending application aforementioned wherein one frame channel 88 of video player 74 displays program schedule information alternately repeated under the headings "NOW" and "NEXT" for 23 second intervals at the beginning of each minute during each half hour program period. Toward that end, the film is advanced in opposite directions one frame at a time under control of the sequence controller 24 as well be explained hereinafter in detail. Following each 23 second interval display, a summary of program schedules is displayed on the other channel 90 of the video player 74 for 22 second intervals. The commercial material is displayed during the final 15 second interval of each minute from a single channel 92 associated with the video player 76. The video player 76 is advanced one frame at a time in the same direction until the material on channel 92 is exhausted at which point the film drive of the video player 76 is reversed and commercial material is displayed through the other channel 94. Selection of the material to be displayed from the four channels of the two video players is effected through the video switch 16 to which the four channels are connected. Reversal of the film drive for the video players is controlled by commands from the sequence controller 24 which also controls operation of the video switch. The display of information derived from the video players is coordinated with the audio material recorded in source 46 by means of control line 96 which also extends to the video switch as shown in FIG. 3. The audio record source 46 includes a pair of conventional audio player units 98 and 100 that are timely switched on by signals from an audio controller 102 in response to commands from the sequence controller. One or the other of the audio players is shut off by a tone fed to the audio controller 102 through line 104, the shut off tone being recorded on one of the tracks of the audio tape. The output of the appropriate audio player is supplied to the transmitter through the audio switch 48 under control of the audio controller through the select control line 106.

Figure 5:
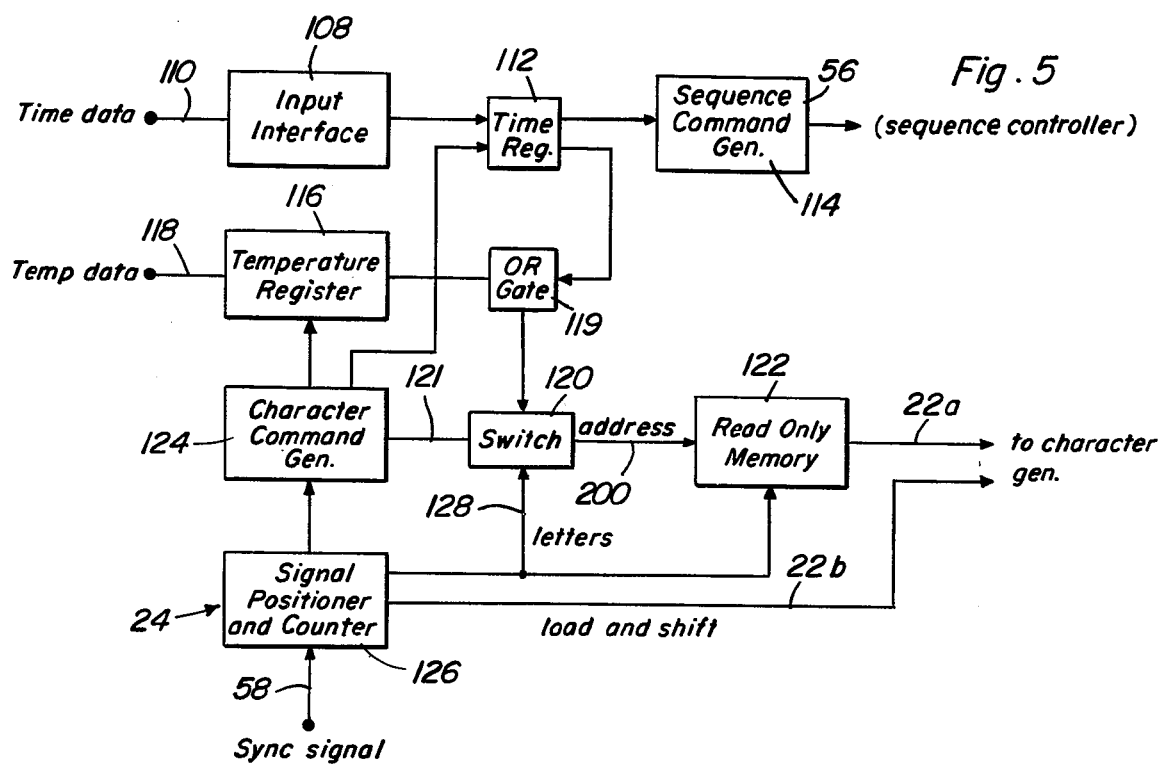
FIG. 5 is a block diagram showing in more detail another portion of the system depicted in FIG. 1.

Referring now to FIG. 5, the sequence controller 24 is diagragramatically depicted and includes an input interface 108 to which the time data is supplied through input lines 110. The time data is converted into proper form by a time register component 112 before being fed to a sequence command generator 114 from which the various command signal lines 56 extend to the control components of the system. Also, a temperature register 116 receives BCD coded temperature data through input lines 118 from the digital thermometer, the temperature data being converted into a format producing a three character display. The temperature register 116 is accessed at different times than the time register 112 under control of the character command generator 124 in order to prevent interference between the generation of corresponding characters on the display screen 62 showing the time and temperature data. Outputs of the temperature register 116 and time register 112 are fed through OR gate 119 to an electronic switch 120. The signal output of the switch 120 addresses a read only memory 122 through which the time and temperature numeral information is supplied in an orderly fashion to the character generator through line 22a. The character command generator 124 controls operation of the switch 120 through an address select line 121. The positioning of the characters generated by the character generator is controlled by a signal positioner and counter 126 which is operative through control line 128 on the switch 120 in order to effect display of the time or temperature numerals in proper position. When switch 120 is made inoperative by signals in line 128, letters stored in memory 122 are sequentially read out over line 22a to form the headings on screen 62 as aforementioned. Thus, the signals in line 128 cause generation of the letters and numbers in proper order through the character generator 26 to which line 22a is connected. The signal positioner and counter 126 also controls operation of the character generator 26 through the load and shift line 22b.

The clock 18 diagrammatically depicted in FIG. 1 is an integrated circuit which counts the 60 Hz power line wave form cycles to provide the time data to the sequence controller 24 through which the remainder of the system is controlled and from which the time information is derived for display. For example, the time data may appear in multiplexed form on one set of BCD lines 110 as denoted in FIG. 5. The time data input is demultiplexed in the signal input interface 108 and held in six registers associated with the time register 112 corresponding to six digits of time to the second. The time data then operates the sequence command generator 114 from which the various command signal lines 56 extend.

Atmospheric temperature is sensed by the digital thermometer 20 converted to a 3-digit format for display. Timing and location signals are developed in the signal positioner and counter 126 to control generation of 31 characters in the disclosed embodiment by means of a standard type of character generator 26 to form the header portion 64 as shown in FIG. 4. Three header formats are produced at location 70 corresponding to "NOW," "NEXT" and "TONIGHT." Each character location in the header is assigned an address through which the character command generator 124 generates commands to select time or temperature data through registers 112 and 116 and operates the select switch 120 to select either numeral or letter addresses presented to the read-only memory 122. Each character location address within the memory 122 contains appropriate alphanumerics for a standard 6-bit format in the output data fed by the memory to the character generator. Readable letters and numerals are thereby produced on the television screen 62, as shown in FIG. 2, by the output data of the character generator 26 placed on the television raster as bright dots on a dark background.

Figure 6:
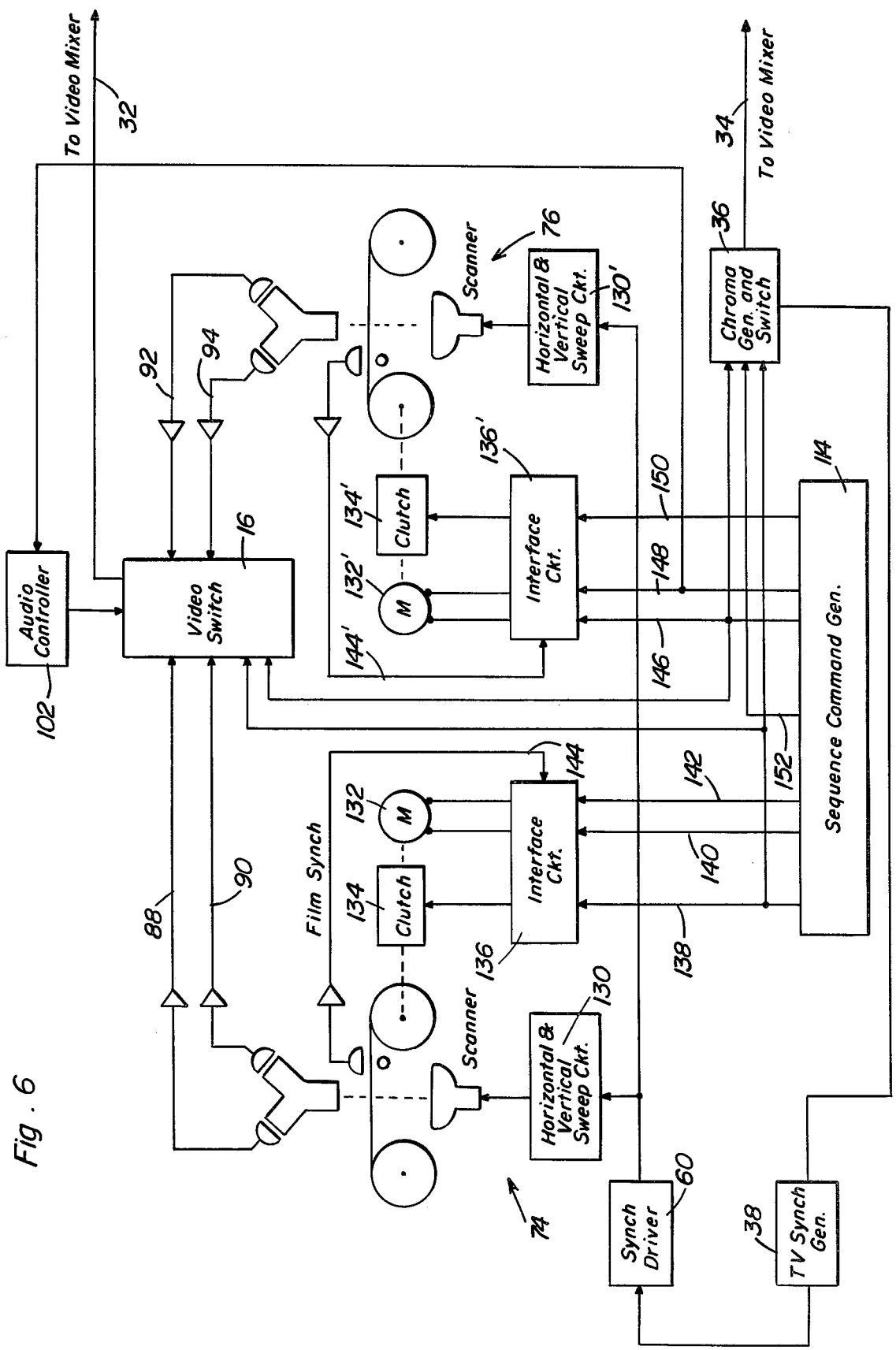
FIG. 6 is a simplified circuit diagram corresponding to a portion of FIG. 3.

The video players 74 and 76 depicted in FIG. 6 scan the films associated therewith in a manner described in detail in prior copending application aforementioned to develop video signals fed to the video switch 16 through the four channels 88, 90, 92 and 94. The video switch selects one of the four channels under control of the sequence commands from the sequence command generator 114. Synchronization of the schedule and commercial video signals is assured by the standard television synch generator 38 feeding synch signals to the sweep circuits 130 associated with the video player units. The television synch generator 38 is also operative to develop a color subcarrier at the standard frequency of 3.58 MHz which is appropriately phase shifted by the chroma generator and switch component 36 to develop the red, green and blue lines 34 used to tint the television raster through the video mixer.

As shown in FIG. 6, the video player unit 74 has its film driven in opposite directions, one frame at a time, through its associated reversing drive which includes the reversible motor 132 and clutch 134. The motor and clutch are controllably energized by commands from the sequence command generator 114 through an interface circuit 136. The interface circuit therefore receive command signals through the command lines 56 which include lines 138, 140 and 142 from the sequence command generator 114 and a film synch signal line 144. The command signal in line 138 is also fed to the video switch 16 and the chroma generator and switch 36 during the initial interval of 23 seconds at the beginning of each 60 second cycle in order to effect transmission of the video signal through frame channel 88 and produce a red tint in the display. The command signal in line 140 is operative through the interface circuit 136 to energize the motor 132 in order to cause advancement of the film for a 10 second interval preceding the end of each 60 second cycle. To prevent premature stopping of the film when advanced, a command signal of two seconds duration is simultaneously fed to the interface circuit from the sequence command generator through command signal line 142. The film synch signal in line 144 is operative through the interface circuit to effect precise stopping of the film at an operative frame position. During the next 60 second cycle, the command signals are operative to effect transmission of the video signal and advancement of the film in a reverse direction.

Command signal lines 146, 148, and 150 extend from the sequence command generator 114 to the interface circuit 136' associated with the video player unit 76 having a similar reversible motor 132' and clutch 134' to effect advancement of the film. The command signal line 146 supplies a command signal through the interface circuit 136' to the reversing drive for the video player unit 76 for the final 15 second interval of each 60 second cycle. The command signal line 146 is accordingly also connected to the video switch 16 and the chroma generator and switch 36. The command signal line 148 is operative to transmit a command signal for the 10 second interval at the beginning of each 60 second cycle in order to effect advancement of the film in one direction. The command signal line 150 is operative during a two second interval at the beginning of each cycle to assure that the film is not prematurely stopped before it reaches its operative frame position. Precise stopping of the film at the frame position is effected by the synch signal in line 144' connected to the interface circuit. Command signal line 148 is also connected to the audio controller 102 through which operation of the audio record source is coordinated with the selected video signals supplied by the video switch 16 to the video mixer through line 32. A command signal line 152 from the sequence command generator 114 is connected to the chroma generator and switch 36 in order to change the color tint of the display to blue during display of the program summary schedule from channel 90 of the video player unit 74 during the 22 second interval following the initial 23 second interval during which information is transmitted from channel 88. A green color tint, on the other hand, is selected for the display during supply of video signals from the video player unit 76 and toward that end, the command signal line 146 is connected to the chroma generator and switch 36.

It should, of course, be appreciated that the foregoing color assignments may be changed. The color signals are combined with the video signals from the character generator 26 as shown in FIG. 1 and with the composite synch and blank signal from generator 38 to create the standard video wave forms applicable to any cable television modulator.

The sequence command generator 114 is operative through command signal lines 146, 148 and audio controller 102 to timely turn on the standard audio tape players 98 and 100 as aforementioned in connection with FIG. 3. The tapes associated with these audio players have separate tracks for the audio material which accompanies the video signals and for the cueing tones fed to the audio controller 102 by line 104 in order to turn off the audio player. The audio switch 48 selects the proper audio player output under control of the select line 106 from the audio controller 102. The selected audio output is amplified by amplifier 50 as shown in FIG. 1 for use by the cable television channel modulator in the transmitter 44 while the audio monitor 54 receives the audio output for local monitoring to assist in tape set up of the audio players.

Figure 7:
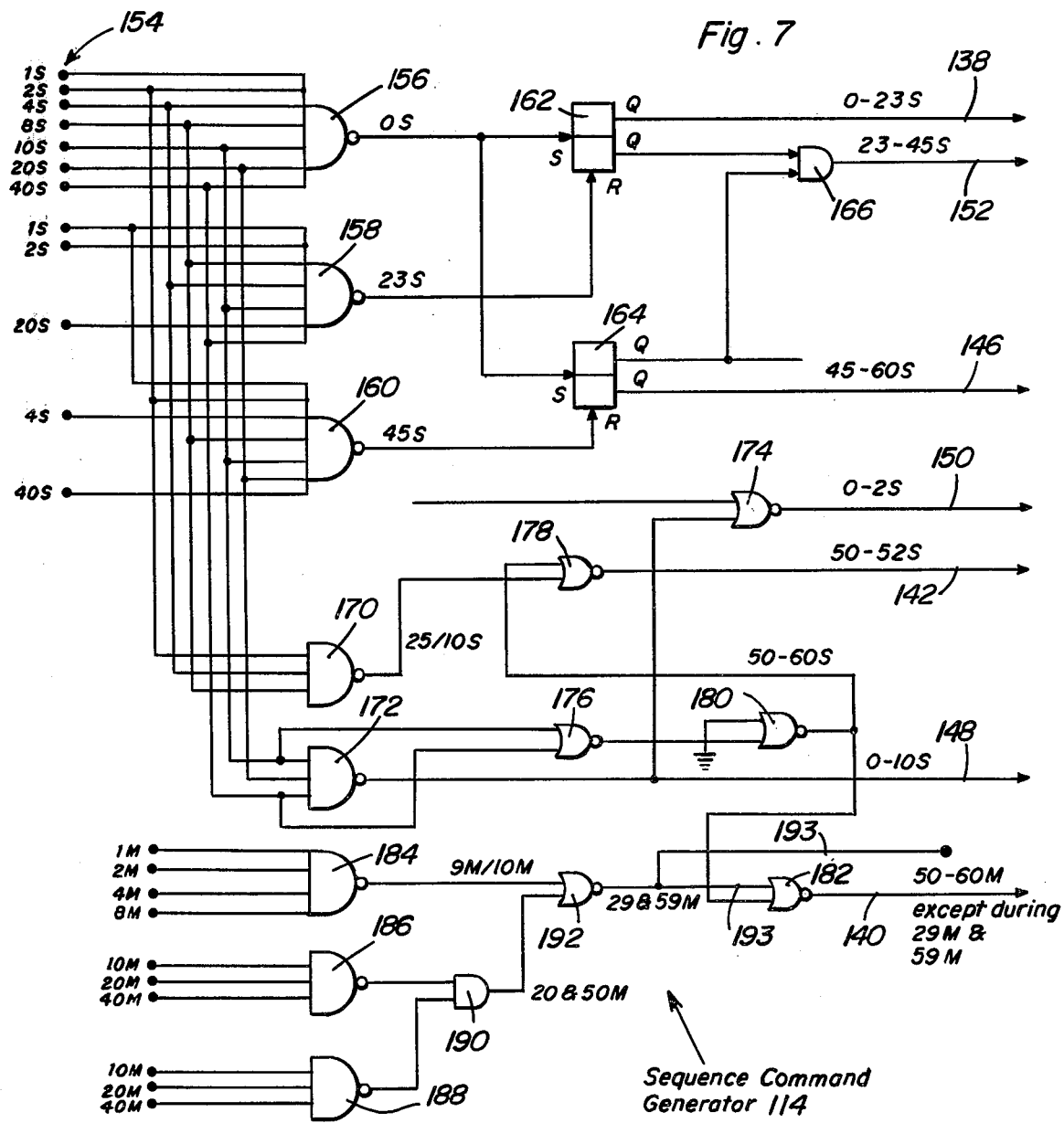
FIG. 7 is a circuit diagram of the sequence command generator shown in FIG. 5.

The sequence commands are generated in the sequence command generator 114, as more particularly shown in FIG. 7, by logic elements connected to the time outputs of the time register 112 aforementioned. The commands are logical level signals developed in the command signal lines 138, 140, 142, 146, 148, 150, and 152. The input to the sequence command generator from the time register is in the form of six digits of time of day stored in a BCD format. Both the BCD input and their complements are available as outputs from time register for supply to the sequence command generator at input terminals generally referred to by reference numeral 154 in FIG. 7. The time data input at the input terminals 154 are applied to NAND gates 156, 158 and 160 to produce logic signals at the beginning of each 60 second cycle and at the 23 second and 45 second instants. The 0 second signal output of NAND gate 156 sets a flip-flop 162 which is reset by the 23 second signal output of the NAND gate 158 in order to produce a command signal during the initial 23 second interval in command signal line 138 connected to one of the outputs of the flip-flop 162. The output of the NAND gate 156 is also connected to the set terminal of a second flip-flop 164, the second flip-flop being reset by the 45 second output signal from NAND gate 160. One of the outputs of flip-flop 164 is connected to one of the input terminals of AND gate 166 to which the other output of flip-flop 162 is connected in order to produce a command signal in line 152 during the 23 to 45 second interval. The other output of flip-flop 164 is connected to the command signal line 146 in order to produce a command signal during the 45 to 60 or final 15 second interval of each 60 second cycle.

The time input terminals 154 are also connected to NAND gates 170 and 172 for generating the other command signals in command signal lines 140, 142, 148, and 150. The output of NAND gate 170 produces a signal active for the first 2 seconds of each 10 second interval; i.e., six 2-second signals per minute. The output of NAND gate 172 produces a command signal during the initial 10-second interval of each minute in line 148 and is applied as an input to gate 174. The outputs from gates 170 and 172 are combined by NOR gate 174 to produce a command signal during the initial 2-second interval of each minute in command signal line 150.

Two of the inputs of gate 172 are also fed to NOR gate 176. Gate 176 produces a signal active during the last ten seconds of each minute after inversion by gate 180. This signal is applied to NOR gate 178 also connected to the output of gate 170 in order to produce a two-second command signal in line 142 active during the 50th to 52nd second of each minute.

The signal from gate 176, in addition to being fed to gate 178, is also applied to one of the inputs to NOR gate 182 in order to produce the 10-second command signal in line 140 each 60-second cycle except during each 29th and 59th cycle. Toward that end, certain time data inputs are connected to NAND gates 184, 186, and 188. The output of gate 184 is active from the ninth to the tenth minute of each ten minute interval; i.e., six times per hour. The output of gate 186 is active from the 20th to 30th minute of each hour and the gate 188 output is active from the 50th to 60th minute of each hour. The outputs from gates 186 and 188 are combined in gate 190 to develop a signal active between minutes 20 to 30 and 50 to 60 of each hour. This signal is applied to one input of NOR gate 192, the other input of which is fed from the output of gate 184. The output of gate 192 is active during the 29th and 59th minute of each hour and is fed to NOR gate 182 in order to cancel the command signal in line 140 each 29th and 59th cycle. The command signal line 140 is thereby operative to prevent reversal of drive and effect unidirectional advancement of the film in video player unit 74 at the end of each half-hour program period in order to update the program schedule information being displayed. This effect is further achieved by virtue of the fact that program film is advanced during even-numbered minutes of each hour and reversed during odd-numbered minutes. Hence, by preventing film motion during the 29th and 59th minutes, a net advancement is produced at the end of each half-hour period.

Figure 8:
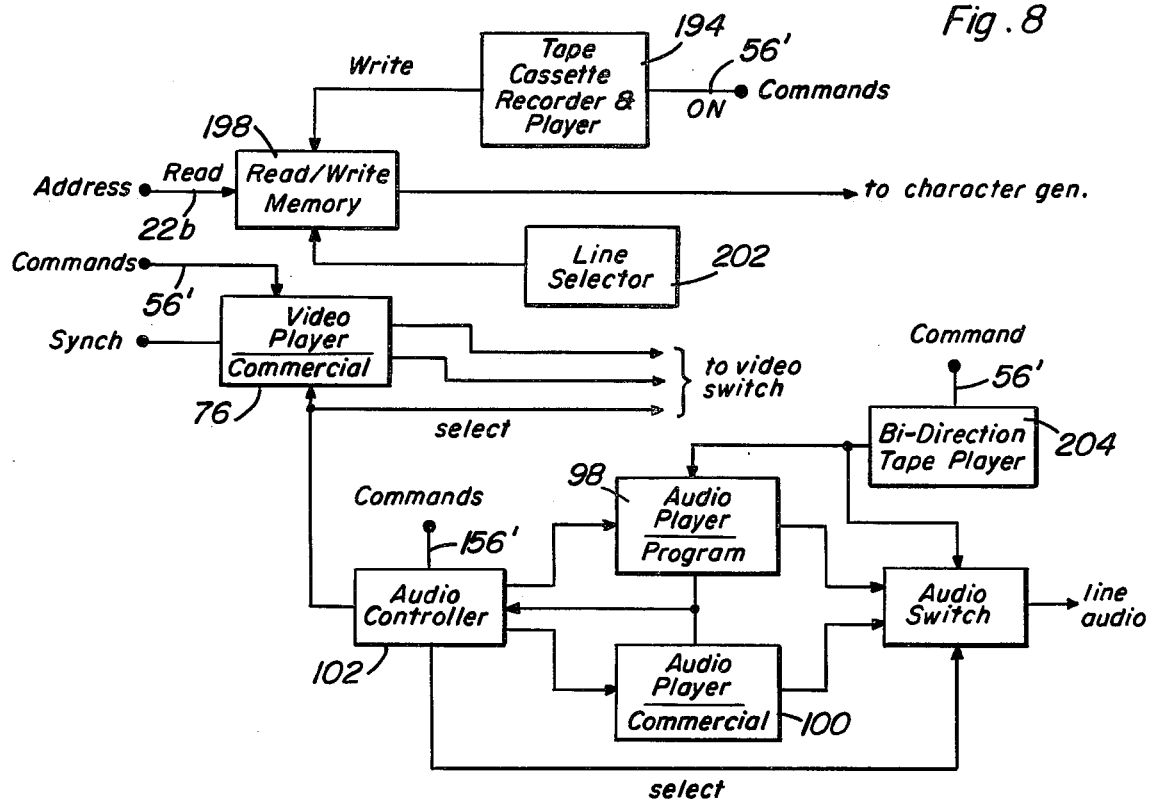
FIG. 8 is a block diagram illustrating another embodiment of the invention.

A variation of the system hereinbefore described is depicted in FIG. 8 which corresponds to the portion of the system shown in FIG. 3. In this form of the invention, no photographic or optical image record is required for the program schedule information ordinarily derived from the video player unit 74. Instead, the video player unit 74 is eliminated and the schedule information is electronically generated by recording and storing of the schedule information in a binary coded format on magnetic tape or other record storage media such as magnetic discs, cards, holograms, and code punched material. In the embodiment depicted in FIG. 8, information in bulk such as 336 half hour segments designed to last a week is stored in a standard 300 foot digital tape cassette unit 194. This unit plays back digital data stored 800 bits per inch on the cassette tape. Information on the program schedules for up to 24 television channels and the time of day for each half hour is thus recorded as 25 lines of characters, each line having 32 character positions. Using a 10-bit binary code, 8,000 bits are thus required to encode each half hour of schedule information on 10 inches of tape. Control signals for start up, slow down and data separating gaps adds another half inch of tape for each half hour segment. The 10.5 inch segment of tape is readout during the 15 second interval of each 60 second cycle when a commercial is being displayed as aforementioned. The data bits are therefore accompanied by clock bits on the tape. Accurate handling of the data is assured by slow tape drive at two inches per second for readout of the 10.5 inch segment of the tape. The data words recorded on the tape are computer generated so as to be compatible with the system as hereinbefore described. Program schedule tapes are prepared for servicing an entire region by listing programs without assignment of channel numbers.

The tape cassette unit 194 under control of commands from the sequence command generator, writes its data into a read/write memory 198 as depicted in FIG. 8 during the final 15 second interval of each half hour segment. Sequence commands in line 56' from generator 114 aforementioned in connection with FIG. 5, cues the schedule information on the tape. Readout of the tape data from the read/write memory 198 occurs after the time and temperature data content of the read-only memory 122 is read into the character generator via line 22b. By means of a line selector component 202, channel number assignments are made for any particular cable television system to be serviced while unwanted program listings are prevented from reaching the character generator.

Figure 9:
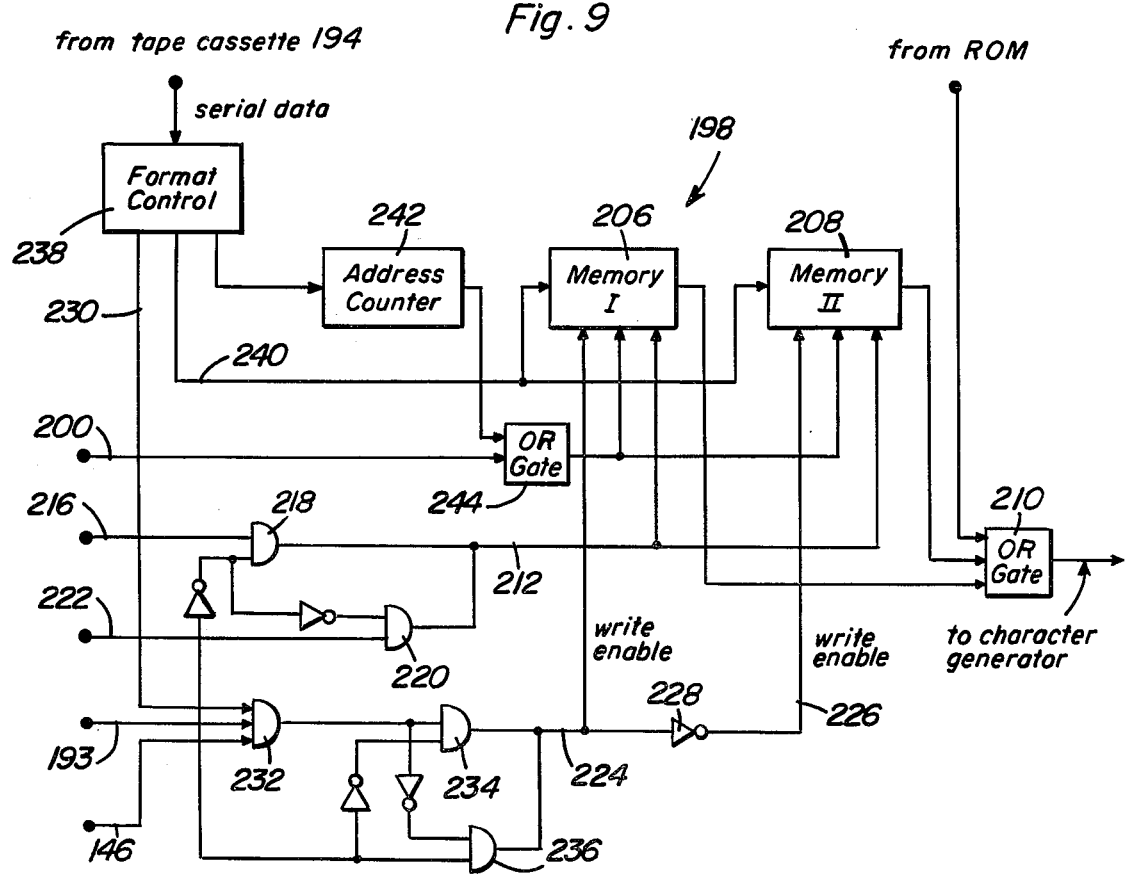
FIG. 9 is a circuit diagram of the read/write memory shown in FIG. 8.

As shown in FIG. 9, the read/write memory 198 includes a pair of memory components 206 and 208 from which program schedule information is alternatively fed to the character generator through an OR gate 210 after the time and temperature contents of the read-only memory 122 is readout. The selection of the memory 206 or 208 from which program schedule readout is obtained is made by signals in a read enable line 212 connected to the memories 206 and 208. Thus, on even numbered minutes, the contents of memory 206 is displayed corresponding to "NOW" while on odd number minutes the contents of memory 208 is displayed corresponding to "NEXT." An odd minute signal line 216 from the time register is gated through AND gates 218 and 220 by a half hour signal in line 222 from the time register to produce the appropriate read enable signals in line 212 for each minute or 60 second cycle.

To update the program schedule information each half hour, the half hour signal in line 222 is operative to control selection of write enable lines 224 and 226, interconnected by inverter 228, through AND gate 232 to which a data ready signal is fed from line 230. Writing is, however, limited to the last 15 seconds of the 29th and 59th minutes of the hour by signals in lines 193 and 146 from the sequence command generator 114 operating through AND gates 232, 234 and 236. The data ready signal is fed to AND gate 232 through line 230 from a data format control 238 receiving serial data from the tape cassette unit 194 which supplies 6-bit data to the memories through lines 240. An address counter 242 to which the format control 238 is connected addresses the memories during write cycles through an OR gate 244. The other input to gate 244 in line 200 (FIG. 5) addresses the memories during the readout cycles thereof.

In order to update the limited amount of audio data contained in the audio player units 98 and 100, as shown in FIG. 8, a bulk storage tape player 204 having a bidirectional drive capability is utilized to supply the audio signals during the "NOW" and "TONIGHT" phases of each 60 second cycle by reloading player 98 once each half-hour with new material. Additional commands are accordingly fed to the tape player 204 and the audio controller 102 from the sequence command generator through command signal lines 56'.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A system for continuously transmitting program schedule information over an informational television channel including a plurality of data sources, video mixing means connected to said sources for combining information received therefrom to produce a composite video modulating output, sequence control means connected to said sources for selection of the information fed to the mixing means, and clock means connected to the sequence control means for timing and updating the selected information fed to the mixing means.

2. The combination of claim 1, wherein the data recorded in said source of recorded data is program schedule information and audio messages.

3. The combination of claim 1, wherein said source of recorded data includes at least one video player having optical image film.

4. The combination of claim 1, wherein one of said sources includes a time register driven by the clock means and a digital thermometer.

5. In combination with a clock and a plurality of sources from which data is selected by selection signals and changed by record changing signals for conversion into video signals fed in sequence to a visual display system, sequence control means connected to said sources including a plurality of gates receiving timing signals from the clock, flip-flop means connected to some of the gates for establishing a continuous sequence of said selection signals of different intervals, control gating means connected to the other of the gates for establishing said record changing signals of shorter duration than the selection signals, and update gating means connected to said control gating means for periodically modifying the record changing signals.

6. The combination of claim 5, wherein one of said sources includes a register driven by the clock for periodically updating information and character generator means connected to the sequence control means for converting information from said sources into said video signals and video mixing means connected to said sources to which the video signals are fed.

7. The combination of claim 6 wherein said sequence control means further includes means for controlling the supply of digital information to the character generator means in synchronized relation to the information selected from another of the sources, said plurality of gates being driven by the register for controlling the selection and changing of information transmitted from the other of said sources.

8. The combination of claim 7, wherein said other of the sources includes a video record player having optical film on which information is recorded on image frames forming at least two image signal channels, reversible motor means for advancing the film, motor control means connected to the motor means for incremental displacement of the film in opposite directions in response to the record changing signals, and video switch means connected to the video record player for connecting one of the signal channels, selected by the selection signals to the video mixing means.

9. The combination of claim 8, including color signal generating means connected to the video mixing means for tinting the composite video output displayed, and means connecting the color signal generating means to the sequence control means for selection of the color signals in response to the selection signals.

10. The combination of claim 7, including color signal generating means connected to the video mixing means for tinting the composite video output displayed, and means connecting the color signal generating means to the sequence control means for selection of the color signals in response to the selection signals.

11. The combination of claim 5, wherein at least one of said sources includes a video record player having optical film on which information is recorded on image frames forming at least two image signal channels, reversible motor means for advancing the film, motor control means connected to the motor means for incremental displacement of the film in opposite directions in response to the record changing signals from the sequence control means, and video switch means connected to the video record player for connecting one of the signal channels, selected by the selection signals of the sequence control means, to the visual display system.

12. The combination of claim 5, wherein at least one of said sources includes recording means on which digital signals are recorded corresponding to program schedule information, memory means for storing data continuously fed thereto from the sources including said digital signals, and character generator means connected to said memory means for converting information from said sources into the digital video signals fed to the visual display system.

13. In combination with a clock and a plurality of data sources, command signal generating means comprising a plurality of gates receiving sequential timing signals from the clock, means connected to some of the gates for establishing a continuous sequence of selection signals of different duration to select data from said sources, control means connected to the other of the gates for establishing record changing signals of shorter duration than the selection signals, to change the selection of data from said sources, and update means connected to said control means for periodically modifying the record changing signals.

14. A system for continuously transmitting program schedule information over an informational television channel including a source of recorded data, a source of digitally generated data, video mixing means connected to said sources for combining information received therefrom to produce a composite video modulating output, sequence control means connected to said sources for selection of the information fed to the mixing means, and clock means connected to the sequence control means for timing and updating the selected information fed to the mixing means, said source of recorded data including a video record player having optical film on which information is recorded on image frames forming at least two image signal channels, reversible motor means for advancing the film, motor control means connected to the motor means for incremental displacement of the film in opposite directions in response to record changing signals from the sequence control means, and video switch means connected to the video record player for connecting one of the signal channels, selected by selection signals from the sequence control means, to the video mixing means.

15. The combination of claim 14, wherein said sequence control means includes a plurality of gates receiving sequential timing signals from the clock means, flip-flop means connected to some of the gates for establishing a continuous sequence of selection signals of different fixed interval duration during cycles having a predetermined period, control gating means connected to the other of the gates for establishing record changing signals of shorter duration than the selection signals during each of said cycles, and update gating means connected to said control gating means for periodically cancelling the record changing signals to effect unidirectional advancement of the film by the motor means.

16. The combination of claim 15, including color signal generating means connected to the video mixing means for tinting the composite video output displayed, and means connecting the color signal generating means to the sequence control means for selection of the color signals in response to the selection signals.

17. A system for continuously transmitting program schedule information over an informational television channel including a source of recorded data, a source of digitally generated data, video mixing means connected to said sources for combining information received therefrom to produce a composite video modulating output, sequence control means connected to said sources for selection of the information fed to the mixing means, and clock means connected to the sequence control means for timing and updating the selected information fed to the mixing means, said source of recorded data including recording means on which digital signals are recorded corresponding to program schedule information, memory means for storing data continuously fed thereto from the sources including said digital signals, character generator means connected to said memory means for converting information from said sources into digital video signals fed to the video mixing means and means connected to the sequence control means for selecting readout of digital information from the memory means to the character generator means.

18. The combination of claim 17, wherein said sequence control means includes a plurality of gates receiving sequential timing signals from the clock means, flip-flop means connected to some of the gates for establishing a continuous sequence of selection signals of different fixed interval duration during cycles having a predetermined period, control gating means connected to the other of the gates for establishing record changing signals of shorter duration than the selection signals during each of said cycles, and update gating means connected to said control gating means for periodically modifying the record changing signals.

19. The combination of claim 18, wherein said source of digitally generated data includes a time register driven by the clock means and a digital thermometer.

* * * * *

UNITED STATES PATENT AND TRADEMARK OFFICE
CERTIFICATE OF CORRECTION

PATENT NO.  : B1 4,203,130

DATED       : November 14, 1989

INVENTOR(S) : Joseph A. Doumit, et al

It is certified that error appears in the above-identified patent and that said Letters Patent is hereby corrected as shown below:

Column 1, line 36, delete [, and];

Column 1, line 37, after generator, insert --[ , and];--

Signed and Sealed this

Twelfth Day of February, 1991

Attest:

HARRY F. MANBECK, JR.

Attesting Officer

Commissioner of Patents and Trademarks

REEXAMINATION CERTIFICATE (1152nd)
United States Patent [19]
Doumit et al.

[11] B1 4,203,130
[45] Certificate Issued Nov. 14, 1989

[54] INFORMATION DISPLAYING SYSTEM

[75] Inventors: Joseph A. Doumit, New Iberia, La.; Robert E. Weiblen, Towson, Md.

[73] Assignee: Dial-A-Channel, Inc., New Iberia, La.

Reexamination Request:
No. 90/001,595, Sep. 1, 1988

Reexamination Certificate for:
Patent No.: 4,203,130
Issued: May 13, 1980
Appl. No.: 758,553
Filed: Jan. 11, 1977

[51] Int. Cl.⁴ .................. H04N 11/00; H04N 5/265
[52] U.S. Cl. ................................ 358/1; 358/83; 358/183; 358/185
[58] Field of Search ............ 358/1, 21 R, 22, 83, 358/142, 146, 183, 185

[56] References Cited
U.S. PATENT DOCUMENTS

| | | | |
|---|---|---|---|
| 2,751,583 | 6/1956 | Jones | 340/367 |
| 3,627,914 | 12/1971 | Davies | 358/183 |
| 3,956,579 | 5/1976 | Doumit | 178/6 |
| 4,199,781 | 4/1980 | Doumit | 358/83 |

OTHER PUBLICATIONS

"The Future of Cable TV," by Archer S. Taylor, *Spectrum*, Nov. 1969.
"MSI Television Growing with Cable TV Industry," *Intermountain Industry*, May, 1971, front cover and p. 8.
"Automated Information Systems Appear on Cable TV Scene," *CM/E-Cable Management/Engineering*, Jul. 1974.
Brochure, TeleMation, Inc., "Weather Channel '97'", Jun., 1971.
Brochure, TeleMation, Inc., "Information Display Channel, TMM-500,".
Brochure, TeleMation, Inc., "Digital Weather Information Channel, Model TMM-1000, " Jun., 1973, with price list.
Brochure, TeleMation, Inc., "Automated Program Origination and Control System, TMM-3000," Jun., 1973, with price list.
TeleMation price list, Sep., 1972 (extract).

*Primary Examiner*—John W. Shepperd

[57] ABSTRACT

Program schedules together with other periodically updated information is displayed to subscribers through a cable television system. The information is derived from optical image recordings and electronically generated from digital circuitry for display in synchronized relation to audio and color signals. The optically derived and digitally generated video signals together with color control signals are combined in a video mixer to modulate the output of a cable television transmitter operating on any desired channel.

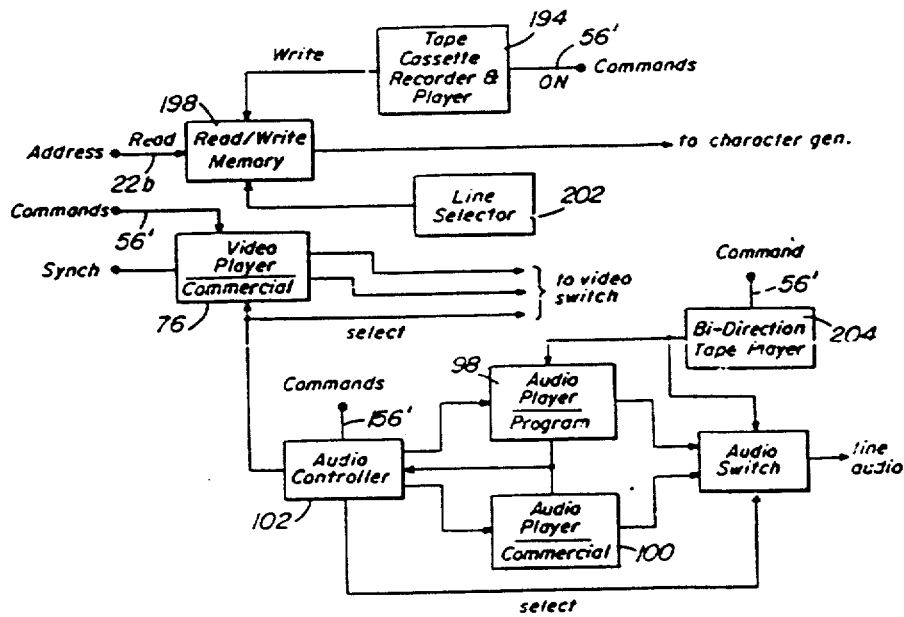

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5-19 is confirmed.

Claim 3 is cancelled.

Claim 1 is determined to be patentable as amended.

Claims 2 and 4, dependent on an amended claim, are determined to be patentable.

New claims 20-27 are added and determined to be patentable.

1. A system for continuously transmitting program schedule information over an informational television channel including: a plurality of data sources [,]; video mixing means connected to said sources *through a digital video signal generator* for combining information received therefrom *with a sync signal* to produce a composite video modulating output[,]; sequence control means connected to said sources for selection of the information fed to the mixing means[, and]; *through the digital video signal generator* clock means connected to the sequence control means for timing and updating the selected information fed *through the digital video signal generator* to the mixing means; memory means for storing data representing a plurality of program listings fed thereto from a data source; and means for selecting readout of program listings data from the memory means to the digital video signal generator.

20. *The system of claim 1 wherein one of said plurality of data sources comprises a record storage medium prepared for servicing an entire region by listing programs without assignment of channel numbers.*

21. *The system of claim 20 further including: means for assigning channel numbers to the program listings read out from the memory means to the digital video signal generator.*

22. *The system of claim 1 or 20 further including serial data receiving means for feeding program listings data from a data source to the memory means.*

23. *The system of claim 1 wherein said memory readout selecting means prevents unwanted program listings from reaching the digital video signal generator.*

24. *The system of claim 17 wherein said recording means is prepared for servicing an entire region of cable television systems by listing programs without assignment of channel numbers.*

25. *The system of claim 24 further including: means for assigning channel numbers to the program listing read out from the memory means to the character generator.*

26. *The system of claim 17 or 24 further including serial data receiving means for feeding program schedule information from said source of recorded data to the memory means.*

27. *The system of claim 17 wherein said memory readout selecting means prevents unwanted program schedule information from reaching the character generator.*

* * * * *